United States Patent [19]
Roberts

[11] Patent Number: 5,313,734
[45] Date of Patent: * May 24, 1994

[54] FISHING ROD HOLDER HAVING A FLEXIBLE CLAMP FOR CASTING AND SPINNING REELS

[75] Inventor: Joseph M. Roberts, Alameda, Calif.

[73] Assignee: Attwood Corporation, Lowell, Mich.

[*] Notice: The portion of the term of this patent subsequent to Aug. 3, 2010 has been disclaimed.

[21] Appl. No.: 50,901

[22] Filed: Apr. 21, 1993

Related U.S. Application Data

[63] Continuation of Ser. No. 956,442, Oct. 2, 1992, Pat. No. 5,231,785, which is a continuation of Ser. No. 814,971, Dec. 23, 1991, abandoned.

[51] Int. Cl.⁵ .................... A01K 97/10; F16M 13/00
[52] U.S. Cl. ..................... 43/21.2; 248/538; 248/514
[58] Field of Search ............ 43/17, 21.2; 248/534, 248/538, 514, 536

[56] References Cited

U.S. PATENT DOCUMENTS

| | | | |
|---|---|---|---|
| 1,952,789 | 3/1934 | Butts | 248/533 |
| 2,204,692 | 6/1940 | Parisio | 248/530 |
| 3,570,793 | 3/1971 | Shackel | 43/21.2 |
| 4,198,775 | 4/1980 | Leisner | 43/21.2 |
| 4,586,688 | 5/1986 | Hartman et al. | 248/538 |
| 4,676,019 | 6/1987 | Engles | 43/21.2 |
| 4,827,654 | 5/1989 | Roberts | 43/21.2 |
| 5,231,785 | 8/1993 | Roberts | 43/21.2 |

OTHER PUBLICATIONS

Carton for BoatMate Molded Rod Holder, L. S. Brown Co., circa 1989.

Primary Examiner—Paula A. Bradley
Assistant Examiner—Chuck Y. Mah
Attorney, Agent, or Firm—Price, Heneveld, Cooper, DeWitt & Litton

[57] ABSTRACT

A fishing rod holder for casting and spinning reels including a holster portion for receiving a rod and a flexible clamp rotatably mounted in a recess on one end of the holster for retaining a reel within the holster. The flexible clamp is discontinuous with an opening less than the diameter of the circumferential slot whereby the opening must be widened by flexing the clamp when assembling the clamp in the recess. The holster includes support flanges extending therefrom and straddling the recess for supporting the clamp in the recess and for providing stops to the rotation of the clamp when locking a rod in the holster or when releasing the rod from the holster.

9 Claims, 3 Drawing Sheets

FISHING ROD HOLDER HAVING A FLEXIBLE CLAMP FOR CASTING AND SPINNING REELS

This is a continuation of application Ser. No. 07/956,442, filed Oct. 2, 1992, now U.S. Pat. No. 5,231,785, which is a continuation of application Ser. No. 07/814,971, filed On Dec. 23, 1991, now abandoned, both entitled FISHING ROD HOLDER HAVING A FLEXIBLE CLAMP FOR CASTING AND SPINNING REELS.

BACKGROUND OF THE INVENTION

This invention relates generally to fishing equipment, and more particularly the invention relates to a holder for a rod and either a spinning or a casting reel.

Disclosed in my U.S. Pat. No. 4,827,654 is a fishing rod holder for casting and spinning reels in which a holster for supporting the rod and reel has a rigid clamp or locking ring for locking the rod and reel in the holster. The rigid clamp is rotatably positioned in a recess in the holster for locking and releasing the rod and reel. The clamp is semi-circular in cross section which allows the rigid body to be positioned on the holster in the recess. A screw engaging the holster and riding in a slot in the clamp maintains the clamp on the holster.

The present invention is an improvement to the fishing rod holder described in my patent.

SUMMARY OF THE INVENTION

Accordingly, an object of the invention is an improved holder for fishing rods with either casting or spinning reels.

Another object of the invention is a fishing rod holder having fewer parts.

Still another object of the invention is a holder for a fishing rod which is easily assembled.

A feature of the invention is a flexible clamp which is flexed when assembled on a rod holder and which remains on the holster without the need for a fastener.

Another feature of the invention is the provision of support flanges on the holster extending around the recess which receives the clamp and functioning as a stop in rotating the clamp.

The invention and objects and features thereof will be more readily apparent from the following detailed description and appended claims when taken with the drawing.

DETAILED DESCRIPTION OF THE ILLUSTRATIVE EMBODIMENTS

Figure 1:
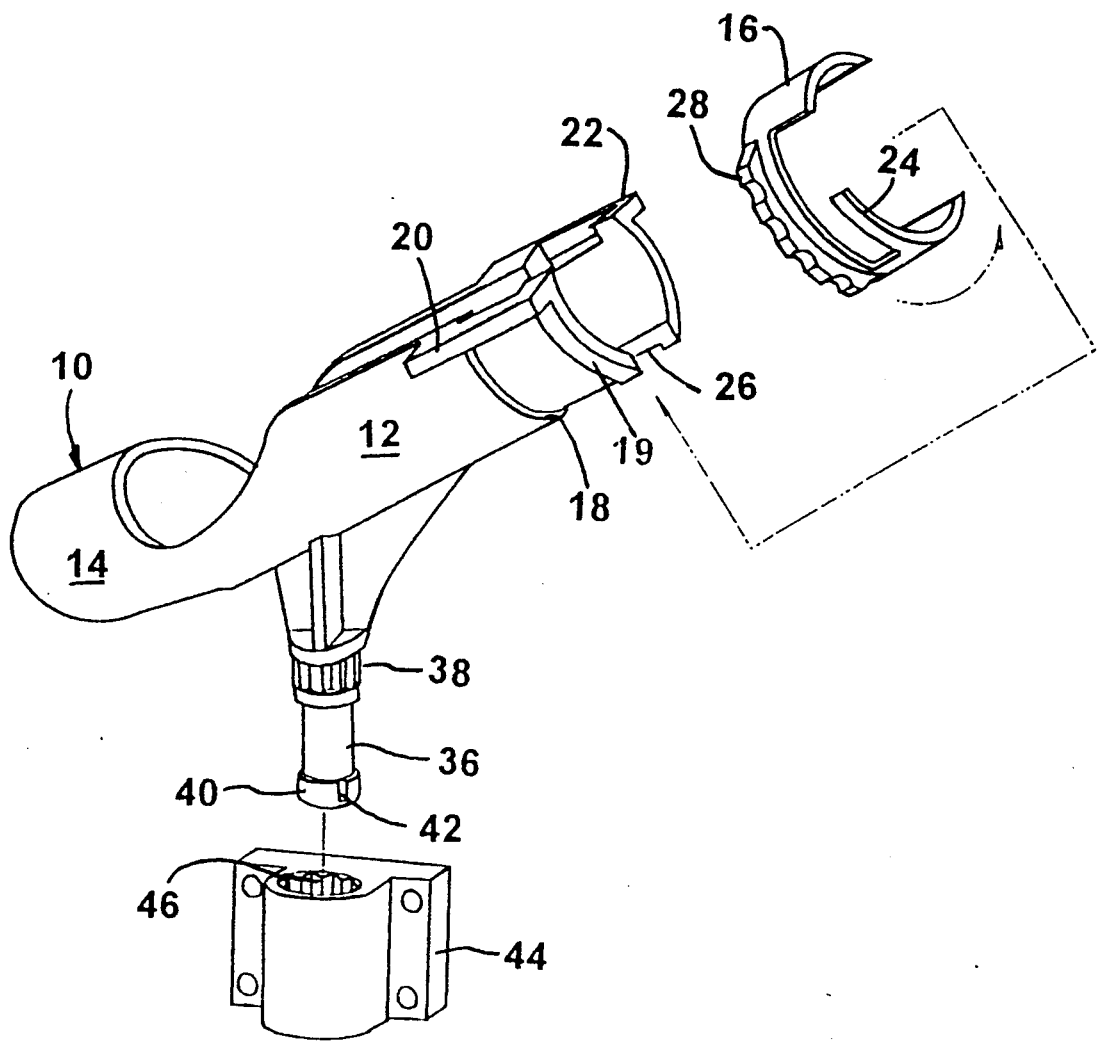
FIG. 1 is an exploded perspective view of the fishing rod holder in accordance with a preferred embodiment of the invention.

Referring now the drawing, FIG. 1 is an exploded view of a preferred embodiment of the invention. The fishing rod holder comprises a holster 10 for supporting the fishing rod and reel. Holster 10 includes a first cylindrical portion 12 having an open side for supporting a rod and a second cylindrical portion 14 having an open side for engaging the handle of the rod, the first and second cylindrical portions being integral with the open sides of the first and second cylindrical portions being axially displaced by 180°.

In accordance with a feature of the invention, a flexible clamp 16 is rotatably positioned in a recess 18 in the circumference of the holster 10 for maintaining a rod and reel in the holster or for releasing the rod and reel from the holster. A protrusion 19 is provided at the end of the recess 18 for preventing clamp 16 from sliding off the holster. The clamp is discontinuous with an opening less than the diameter of the circumferential recess whereby the clamp must be flexed when assembling the clamp on the holster. In accordance with another feature of the invention, support flanges 20, 22 are integral with the holster and extend over the recess 18 for supporting the clamp 16 in the recess and functioning as a stop in rotating the clamp in the recess.

Figure 2:
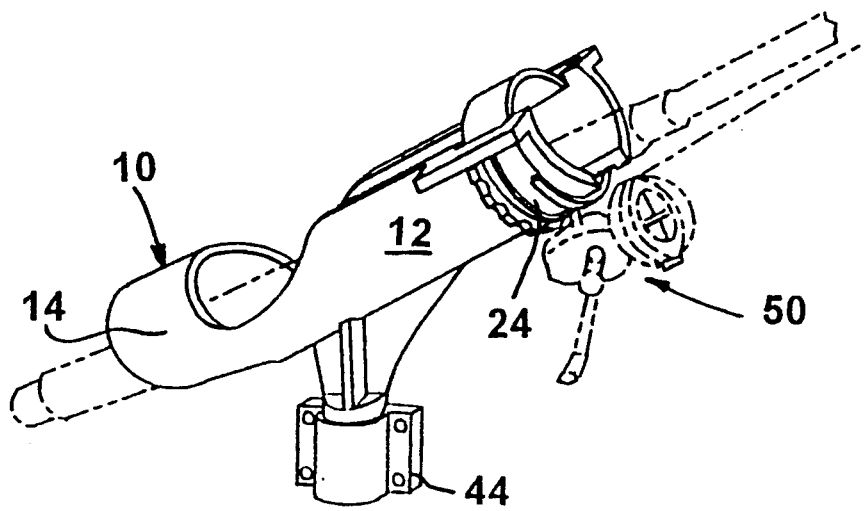
FIG. 2 is an isometric view illustrating the fishing rod holder of FIG. 1 supporting a spinning reel.

The clamp 16 includes an appendage 24 extending outwardly from one side for retaining a spinning rod in the holster as will be described with reference to FIG. 2. A notch 26 is provided in one end of the holster 10 to accommodate a spinning reel, as illustrated in FIG. 2. A knurled portion 28 extends from the clamp 16 for facilitating the manual rotation of the clamp 16 in recess 18. The knurled portion 28 engages the support flanges 20, 22 to limit the rotational travel of the clamp 16 in the recess 18 for locking a rod in the holster and for releasing the rod from the holster, as will be described further hereinbelow with reference to FIGS. 4A and 4B.

Depending from the holster 10 and integral therewith is a post 36 including an undulating surface 38 about a limited portion of the outer surface of the post, and an enlarged end portion 40 having a slot 42 therein. Alternatively, the post 36 can be rotatably fastened to the holster 10 as described in my U.S. Pat. No. 4,827,654, supra. Post 36 is supported in a mount 44 which is permanently attached to a support structure, with the post 36 being inserted into barrel 46 in the mount 44. Barrel 46 has an undulating interior surface which mates with the undulating surface 38 of post 36. As further described in my patent, the interior surface of the barrel 46 includes a protrusion which mates with slot 42 in the enlarged end portion 40 of the post, whereby the post can be inserted into the barrel only when the slot 42 is aligned with the protrusion. Once the post 36 is inserted the protrusion engages the enlarged end portion 40 and prevents the post from being removed from the barrel 46 unless the slot 42 is aligned with the protrusion. Thus, the holster can be rotated horizontally to different positions by withdrawing the undulating portion 38 from the undulating portions of the barrel, but the protrusion engages the enlarged portion 40 of the post to prevent the post and holster from being totally removed from the mount by accident with the possible loss of the rod, reel, and holster.

FIG. 2 is an isometric view of the assembled fishing rod holder with a spinning reel shown generally at 50 positioned in the holster 10. Clamp 16 is rotated about the opening in the first cylindrical portion 12 of the holster with the appendage 24 riding -in the recess 18 in juxtaposition with one side of the recess and locking the spinning reel 50 to the holster 10.

Figure 3:
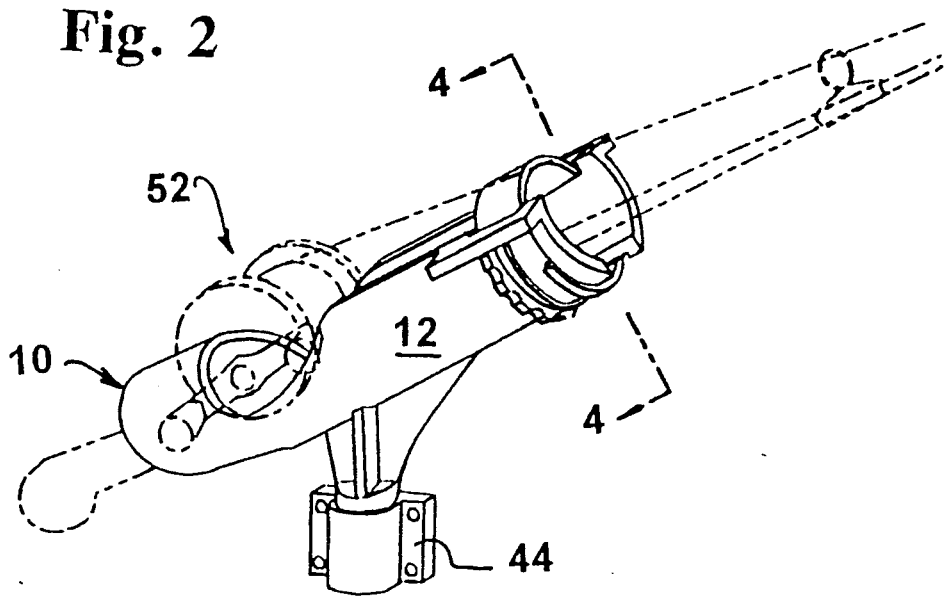
FIG. 3 is an isometric view illustrating the fishing rod holder of FIG. 1 supporting a conventional casting reel.

FIG. 3 is an isometric view of the assembled fishing rod holder with a conventional casting reel 52 supported in the holster 10 Again, the clamp 16 is rotated across the opening in the first cylindrical portion 12, thereby preventing removal of the rod and reel from the holster 10.

Figure 4:
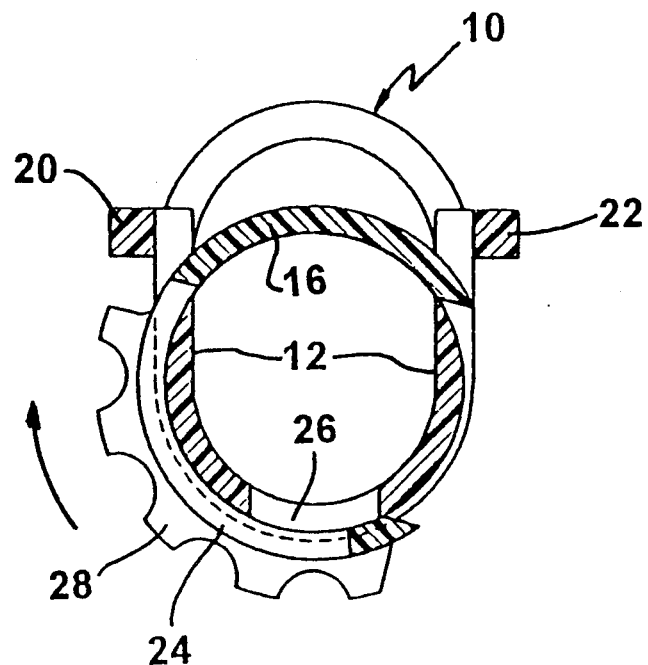
FIG. 4A and FIG. 4B are section views taken along the line 4—4 in FIG. 3 which illustrate the positioning of the clamp in the recess of the holder.
Figure 4:
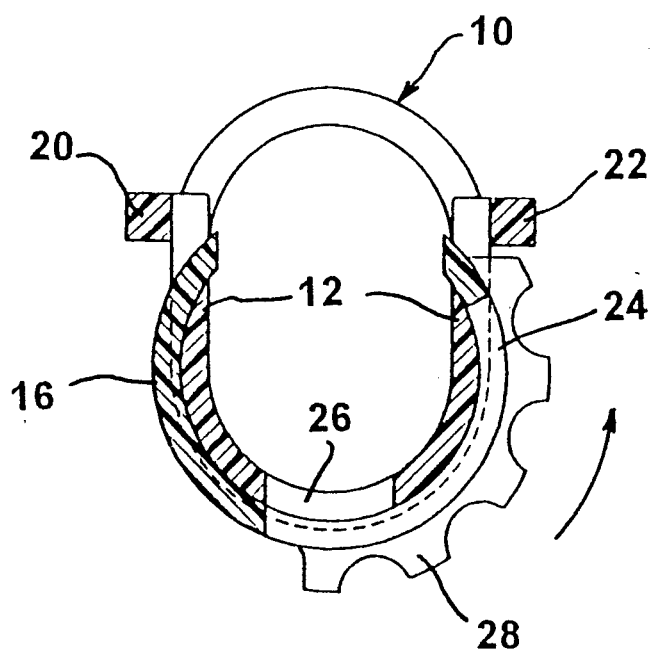

FIG. 4A and 4B are section views taken along the line 4—4 in FIG. 3 and illustrate the positioning of the clamp in the recess of the holder. In FIG. 4A the clamp 16 is rotated clockwise until the knurled portion 28 engages flange 20 as a stop whereupon the clamp 16 covers the opening in the cylindrical portion 12 in the holster. The clamp has beveled end surface to facilitate the clamp riding over a beveled surface in the recess when moving to the lock position. In this position a rod and reel are locked in the holster 10 as illustrated in FIGS. 2 and 3. The appendage 24 rides over the notch 26 thereby locking a spinning reel depending through the notch in the holster. In FIG. 4B the clamp 16 is rotated counter clockwise until the knurled portion 28 engages support flange 22 as a stop and the clamp 16 is removed from the opening of the cylindrical portion 12 thereby allowing a rod and reel to be placed in the holster or removed from the holster.

All parts of the fishing rod holder as illustrated in FIG. 1 are injection moldable. The clamp 16 is formed from a suitable thermal plastic such as polycarbonate which provides strength yet flexibility in the clamp so that the opening of the clamp can be widened when assembling the clamp in the recess 18 of the holster.

While the invention has been described with reference to a preferred embodiment, the description is illustrative of the invention and is not to be construed as limiting the invention. Various modifications and applications may occur to those skilled in the art without departing from the true spirit and scope of the invention as defined by the appended claims.

I claimed:

1. A fishing rod holder comprising a generally elongated, cylindrical holster for receiving a rod, said holster including an outer radial surface and an elongated slot extending lengthwise of said elongated holster for receiving the handle of a rod, said slot defined by opposite edges of said surface extending lengthwise of said holster;

an arcuate clamp slidably and rotatably mounted on said outer radial surface at one end of said holster;

a protrusion means at said one end of said holster for normally preventing the sliding of said clamp lengthwise off said one end of said holster;

said arcuate clamp having spaced ends providing a gap therebetween spaced a distance less than the space between said opposite sides of said radial surface, said clamp being flexible for flexing over said protrusion when assembling said clamp on said holster;

a first flange located on said holster at one edge of said slot and having a portion extending over and spaced a distance from the outer surface on which said clamp is slidably and rotatably mounted thereby providing a first opening between said portion of said first flange and said outer surface on which said clamp is slidably and rotatably mounted;

a second flange located on said holster at the other edge of said slot and having a portion thereof extending over and spaced a distance from said outer radial surface over which said clamp is slidably and rotatably mounted and providing a second opening between said portion of said second flange and the outer surface on which said arcuate clamp is slidably and rotatably mounted;

said clamp being rotatable on said outer surface from a first position in which the gap is aligned with said slot for receiving said rod to a second position where a portion of the clamp extends over said slot for holding a rod therein; and means for stopping the rotation of said clamp in said first position wherein said ends of said arcuate clamp extend through said openings whereby said clamp is self-retained when assembled on said holster without a need for a separate fastener.

2. The fishing rod holder as defined by claim 1 wherein said holster includes a circumferential recess in said one end of said holster, said flexible clamp being rotatably mounted in said recess.

3. The fishing rod holder as defined by claim 2 and further characterized by said clamp having beveled edges to facilitate rotation in said recess.

4. The fishing rod holder as defined by claim 1 and further including an appendage extending from said flexible clamp and integral therewith for locking spinning reel in said holster.

5. The fishing rod holder as defined by claim 4 wherein said holster includes a notch in said one end for receiving a spinning reel depending from a rod in said holster, said appendage locking said spinning reel in said notch.

6. The fishing rod holder as defined by claim 5 wherein said appendage rotates in said recess in juxtaposition therewith.

7. The fishing rod holder as defined by claim 14 wherein said clamp includes a knurled portion extending therefrom for manual rotation of said clamp in said recess, said flanges functioning as stops for limiting rotational travel of said clamp in said recess.

8. The fishing rod holder as defined by claim 1 and further including a support post extending from said holster for engaging a mount attached to a base structure.

9. The fishing rod holder as defined by claim 1 wherein said holster and said flexible clamp are made of injection molded plastic.

* * * * *

UNITED STATES PATENT AND TRADEMARK OFFICE
CERTIFICATE OF CORRECTION

PATENT NO. : 5,313,734
DATED : May 24, 1994
INVENTOR(S) : Joseph M. Roberts

It is certified that error appears in the above-indentified patent and that said Letters Patent is hereby corrected as shown below:

Column 2, line 67:
  After "holster 10" insert --.--.

Column 4, line 33, claim 4:
  After "locking" insert --a--.

Column 4, line 43, claim 7:
  "claim 14" should be --claim 1--.

Signed and Sealed this

Thirteenth Day of December, 1994

Attest:

BRUCE LEHMAN

*Attesting Officer*    *Commissioner of Patents and Trademarks*